J. C. HOLTON.
Horse Hay-Rake.
No. 199,440. Patented Jan. 22, 1878.
Fig: 1.
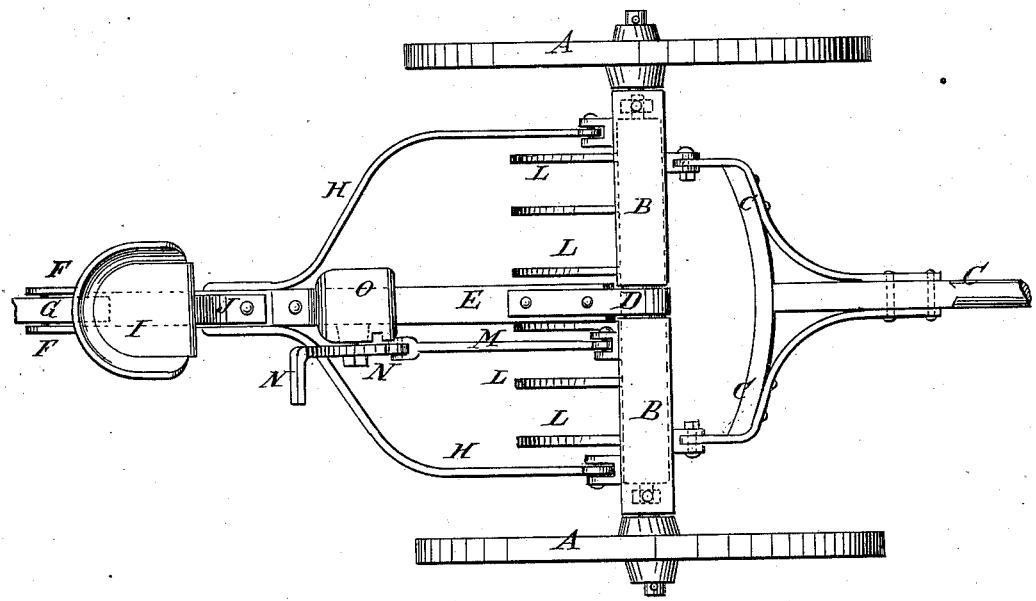
Fig: 2.
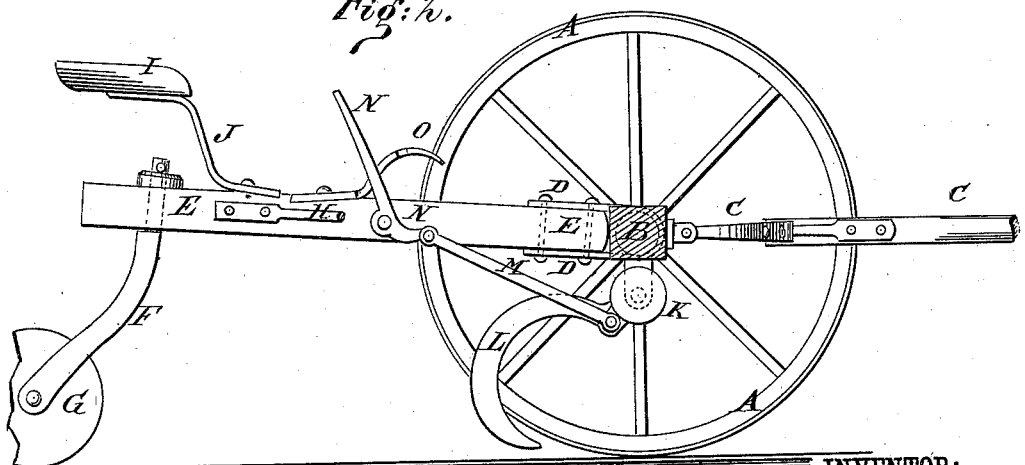
WITNESSES:
Chas. Nida
J. H. Scarborough
INVENTOR:
J. C. Holton
BY Munn & Co.
ATTORNEYS.

UNITED STATES PATENT OFFICE.

JOHN C. HOLTON, OF OWENSBOROUGH, KENTUCKY, ASSIGNOR TO HIMSELF, WM. C. GOUGH, AND S. C. GOUGH, OF SAME PLACE.

IMPROVEMENT IN HORSE HAY-RAKES.

Specification forming part of Letters Patent No. 199,440, dated January 22, 1878; application filed October 29, 1877.

*To all whom it may concern:*

Be it known that I, JOHN CHARLES HOLTON, of Owensborough, in the county of Daviess and State of Kentucky, have invented a new and useful Improvement in Horse Hay-Rake, of which the following is a specification:

Figure 1 is a top view of my improved horse hay-rake. Fig. 2 is a side view of the same, partly in section to show the construction.

Similar letters of reference indicate corresponding parts.

The object of this invention is to furnish an improved horse hay-rake which shall be so constructed that the raking shall be done in front of the driver, so that he can see how the work is being done without turning, which may also be used for bunching from a window, and which shall be simple in construction, strong and durable, easily operated, and reliable in operation, doing its work thoroughly.

The invention consists in the combination of the rake, the connecting-rod, and the bent lever with the axle and the hinged bar or beam of the carriage, as hereinafter fully described.

A are the wheels, which revolve upon the journals of the axle B. C is the tongue, the forked rear end of which is hinged to the forward side of the axle B. The middle part of the axle B is rounded off to receive the strap D, the ends of which are attached to the upper and lower side of the forward end of the bar or beam E, to hinge the said bar or beam to the axle. To the rear end of the bar or beam E is swiveled the standard F, to the lower end of which is pivoted a small wheel, G. The bar or beam E is strengthened against side strain by the braces H, the rear ends of which are bolted to the opposite sides of the rear part of the said bar or beam E, and their forward ends are hinged to the rear side of the axle B.

This construction of the frame-work of the machine enables the rake to operate upon uneven ground with the same facility as upon level ground.

I is the driver's seat, which is attached to the upper end of the spring-standard J. The lower end of the spring-standard J is attached to the rear part of the bar or beam E. K is the rake-shaft, the journals of which revolve in bearings attached to the lower side of the axle B. To the shaft K are attached the shanks of the curved teeth L. To the middle part of the shaft K is hinged the forward end of the connecting-rod M, the rear end of which is pivoted to the short arm of the bent lever N. The lever N is pivoted at its bend to the side of the bar or beam E, and its upper end projects into such a position and is so formed that it may be operated by the driver with his foot to raise the teeth L and discharge the collected hay. To the upper side of the bar or beam E is attached a foot-board, O, in the side edges of which is formed a notch to receive the lever N and lock the teeth L in position to collect the hay.

Having thus described my invention, I claim as new and desire to secure by Letters Patent—

The combination of the rake K L, the connecting-rod M, and the bent lever N with the axle B and the beam or bar E of the truck-carriage, substantially as herein shown and described.

JOHN CHARLES HOLTON.

Witnesses:
WM. H. MCHENRY,
J. M. YEWELL.